United States Patent [19]
Moore

[11] 3,722,482
[45] Mar. 27, 1973

[54] SCAVENGER MECHANISM FOR TWO-CYCLE INTERNAL COMBUSTION ENGINE

[76] Inventor: James R. Moore, 623 N. Belleview Ave., San Dimas, Calif. 91773

[22] Filed: July 9, 1970

[21] Appl. No.: 53,367

[52] U.S. Cl. .................................. 123/66, 123/65 VB
[51] Int. Cl. ............................................ F02b 33/04
[58] Field of Search.... 123/65 VB, 65 VC, 75 RC, 75 CC, 123/51 B, 65 R, 66, 47

[56] References Cited

UNITED STATES PATENTS

| | | | |
|---|---|---|---|
| 1,186,350 | 6/1916 | Wagner | 123/66 |
| 1,270,585 | 6/1918 | Avilla | 123/66 |
| 1,726,073 | 8/1929 | Kinder | 123/66 |
| 1,740,040 | 12/1929 | Sapienza | 123/65 VB |
| 2,962,010 | 11/1960 | Newton | 123/65 VC X |
| 1,220,095 | 3/1917 | Gray | 123/66 |

FOREIGN PATENTS OR APPLICATIONS

| | | | |
|---|---|---|---|
| 470,941 | 10/1914 | France | 123/66 |
| 429,505 | 9/1911 | France | 123/66 |
| 386,945 | 4/1931 | Great Britain | 123/66 |

*Primary Examiner*—Wendell E. Burns
*Attorney*—A. Yates Dowell and A. Yates Dowell, Jr.

[57] ABSTRACT

Apparatus adapted to be operated by the piston rod of an internal combustion engine to remove foul air and unburned fuel from the cylinders substantially at the completion of the power stroke and to introduce a fresh charge of a combustible mixture into the cylinder to be compressed on the compression stroke. The apparatus includes a scavenger plate located within the cylinder which is raised and lowered both independently of and in conjunction with the piston.

6 Claims, 13 Drawing Figures

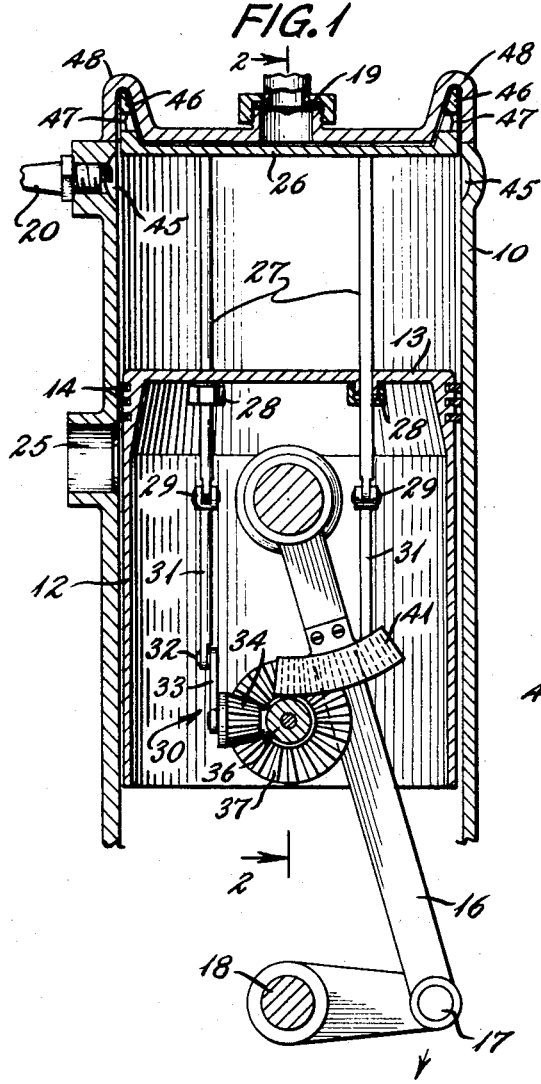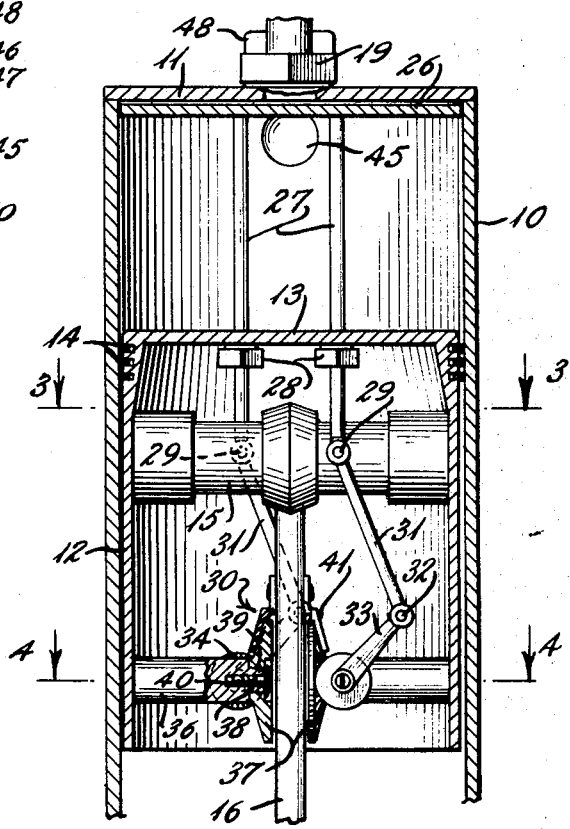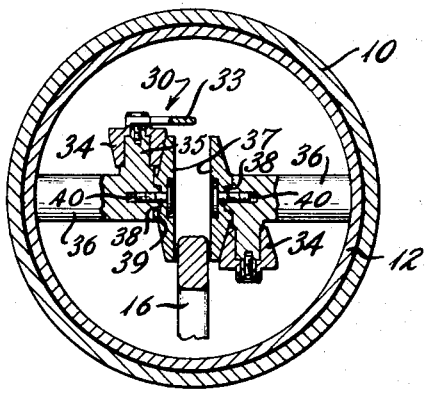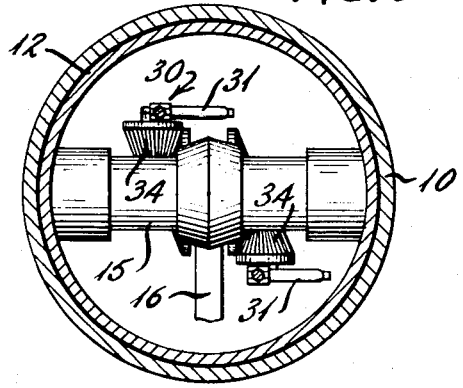
FIG. 1
FIG. 2
FIG. 3
FIG. 4
INVENTOR
JAMES R. MOORE
BY
ATTORNEY

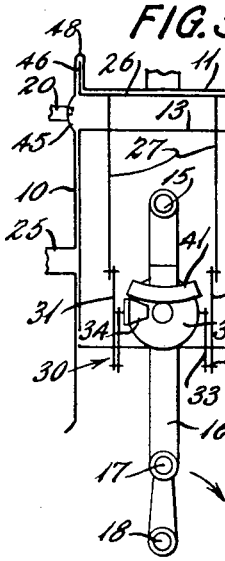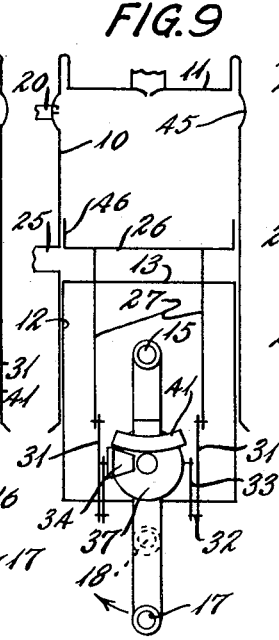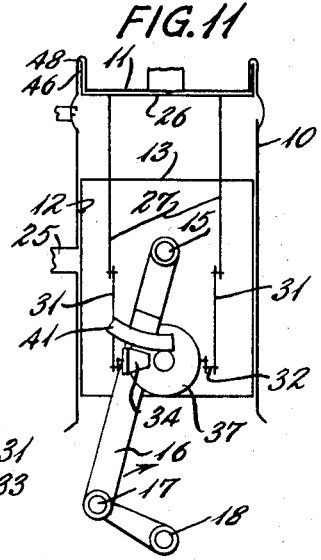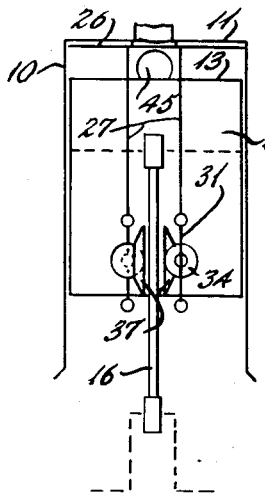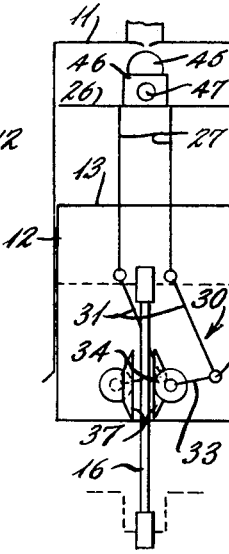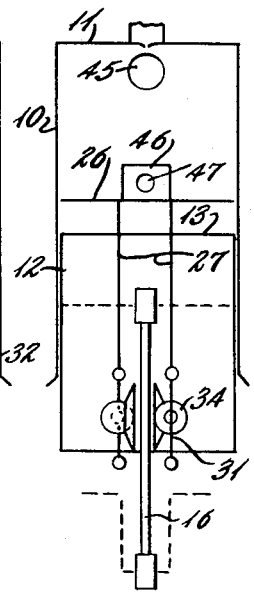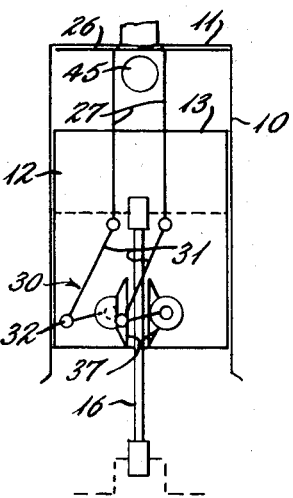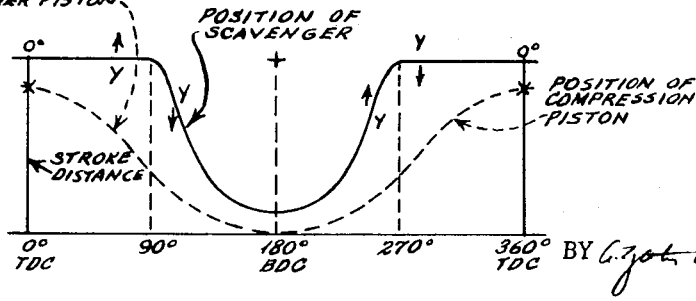

3,722,482

SCAVENGER MECHANISM FOR TWO-CYCLE INTERNAL COMBUSTION ENGINE

BACKGROUND OF THE INVENTION

1. Field of the Invention

This invention relates generally to power plants of various kinds and relates particularly to an internal combustion engine of the two-cycle type which is provided with a scavenging mechanism to assist in the exhausting of hot gases and burned fuel, as well as the introduction of a combustible mixture into the cylinder.

2. Description of the Prior Art

Heretofore many efforts have been made to provide a two-cycle internal combustion engine; however, these prior art devices have not been satisfactory since they have been complicated and expensive to produce and install, have not been sufficiently reliable in operation, have caused the loss of fresh fuel through the exhaust port which has reduced economy, have mingled exhaust residue with fresh fuel which has diminished power, have had poor efficiency due to the introduction of a combustible mixture into the cylinder before the exhaust phase has been completed which has resulted in a low volume of fresh combustible mixture being inducted. Some efforts have been made to provide a scavenger mechanism for a two-cycle engine; however, these have increased the complexity of the engine, have been difficult to time, have usually been mounted on the crankshaft or other related apparatus, and for other reasons have not served the purpose for which they were intended.

SUMMARY OF THE INVENTION

The present invention is a scavenger mechanism for a two-cycle internal combustion engine having a piston swingably mounted on one end of a connecting rod, the opposite end of which is pivotally connected to the main crankshaft of the engine. The apparatus includes a pair of sector or quadrant gears mounted on opposite sides of the connecting rod and meshing with a pair of bevel gears which in turn mesh with pinion gears carried by an epicyclical drive train carried by the piston for raising and lowering a scavenger plate independently of and in conjunction with the up-and-down movement of the piston. The scavenger plate normally is maintained adjacent to the top of the cylinder during the initial portion of the power stroke to permit substantially free expansion of the hot gases and thereafter rapidly moving toward the piston to exhaust the hot air and gases through an exhaust port during the last part of the power stroke and simultaneously to introduce a fresh charge of combustible mixture into the upper portion of the cylinder. During the initial portion of the compression stroke of the piston, the scavenger plate is moved rapidly to the top of the cylinder while bypassing the combustible mixture so that the piston will compress the combustible mixture during the last portion of the compression stroke.

It is an object of the invention to provide a scavenger mechanism for an internal combustion engine which is operated solely by the swinging movement of the connecting rod between the piston and the crankshaft.

Another object of the invention is to provide a scavenger mechanism for an internal combustion engine having gear means for operating a scavenger plate independently of and in conjunction with the movement of the piston of the engine.

BRIEF DESCRIPTION OF THE DRAWINGS

FIG. 1 is a fragmentary vertical section of one cylinder of an internal combustion engine and illustrating the scavenger mechanism of the present invention.

FIG. 2 is a section on the line 2—2 of FIG. 1.

FIG. 3 is a section on the line 3—3 of FIG. 2.

FIG. 4 is a section on the line 4—4 of FIG. 2.

FIG. 5 is a schematic of the apparatus at the beginning of the power stroke.

FIG. 6 is a schematic taken at right angles to that of FIG. 5.

FIG. 7 is a schematic similar to FIG. 5 and illustrating the power stroke partially completed.

FIG. 8 is a schematic taken at right angles to that of FIG. 7.

FIG. 9 is a schematic taken at bottom dead center of the crank.

FIG. 10 is a schematic taken at right angles to that of FIG. 9.

FIG. 11 is a schematic of the parts during the compression stroke.

FIG. 12 is a schematic at right angles to that of FIG. 11.

FIG. 13 is a diagram of the operating cycle.

DESCRIPTION OF THE PREFERRED EMBODIMENT

With continued reference to the drawings, an internal combustion engine is provided with a cylinder having a wall 10 with a head 11 connected thereto in any desired manner. As illustrated the cylinder wall 10 is air cooled although if desired the cylinder wall could form part of the water jacket of a water-cooled engine. A hollow, generally cylindrical piston 12 having a piston head 13 is slidably mounted within the cylinder wall 10 and preferably such piston includes a plurality of compression rings 14 disposed about its periphery adjacent to the head 13. In order to raise and lower the piston 12, a wrist pin or pivot 15 extends across the inner periphery of the piston and swingably receives one end of a connecting rod 16. The opposite end of the connecting rod is pivotally mounted on a crank 17 forming a portion of a crankshaft 18.

A reed intake valve 19 is located on the cylinder head 11 and is connected to any desired source of combustible fuel such as a carburator or the like (not shown) in which fuel and air are mixed in a desired proportion and introduced through the red intake valve into the cylinder 10. A spark plug or other igniting device 20 is located in the upper portion of the cylinder and an electrical spark is created by the spark plug after the combustible mixture has been compressed by the piston to cause the volatile combustible mixture to burn very rapidly so that the expanding gases will drive the piston downwardly during the power stroke to rotate the crankshaft 18. The structure thus far described is conventional and forms no part of the inventive concept.

In a two-cycle internal combustion engine, an exhaust port 25 is provided in the cylinder wall 10 in a position such that the exhaust port will be uncovered by the piston during the final stages of the power stroke so that the hot gases can be exhausted from the cylinder. Ideally it is desirable that a fresh charge of combustible mixture be introduced into the cylinder during the power stroke and while the hot gases are being discharged through the exhaust port. In order to do this, a scavenger plate 26 is located within the cylinder wall 10 between the cylinder head 11 and the piston head 13. The scavenger plate 26 has a diameter slightly less than the bore of the cylinder and includes a pair of spaced generally parallel rods or arms 27 which extend downwardly through the piston head 13 and through gas seals 28 into the interior of the piston 12.

The lower end of each of the arms 27 is connected by a pivot 29 to an epicyclical drive train 30 including upper links 31 connected at one end to the arms 27 by the pivots 29 and connected at the opposite ends by pivots 32 to one end of lower links 33. The opposite end of each of the lower links 33 is fixed to a pinion gear 34 rotatably mounted in any desired manner on a shaft 35 carried by a gear boss or shaft 36. It is noted that a pair of gear bosses or shafts 36 are provided which are mounted on the wall structure of the piston 12 and extend inwardly substantially in alignment with each other but providing a central space through which the connecting rod 16 is adapted to pass. A bevel gear 37 is freely rotatably mounted on the inner end of each of the gear bosses 36 in any desired manner, as by a cylindrical shoulder 38 (FIGS. 2 and 4) on each of the gear bosses. The shoulders 38 are received within a recess 39 in the bevel gears 37 and retained therein by a fastener 40. The bevel gears 37 mesh with the pinion gears 34.

In order to reversibly oscillate the bevel gears 37 and thereby raise and lower the scavenger plate 36 by the epicyclical drive train 30, a sector or quadrant gear 41 is fixed to each side of the connecting rod 16 in a position to mesh with the bevel gears 37. It is apparent from FIG. 2 that the upper and lower links 31 and 33, respectively, of the epicyclical drive train are disposed in the path of movement of the connecting rod 16; however, the epicyclical drive train and the connecting rod 16 are in timed relation with each other, as will be described later. It is noted that hypoid gears or other mechanical means such as cams, levers and the like could be substituted for the bevel gears 37 and pinion gears 34 to simplify the movement of the scavenger plate 26 relative to the piston head 13.

As illustrated in FIG. 1, the cylinder wall 10 may be provided with a plurality of recesses 45 equally spaced about the periphery of the cylinder. The spark plug 20 is located within one of the recesses so that the electrodes do not project into the path of the scavenger plate 26. Generally in alignment with each of the recesses, the scavenger plate 26 is provided with an upstanding lip 46 and each of such lips is higher than the width of the associated recesses to prevent the still expanding gases from bypassing the scavenger plate 26 during the initial downward movement of the scavenger plate during the power stroke. Preferably a one-way valve 47 is disposed in each lip to permit fresh fuel to pass therethrough when the scavenger plate is returned to the uppermost position during the initial phases of the compression stroke of the piston 12. The cylinder head 11 is provided with an upstanding cave or compartment 48 of a size to accommodate each of the lips 42. If desired the cage or compartment 48 could extend around the entire periphery of the cylinder head.

In the operation of the device, just before the connecting rod of the piston reaches top dead center, as illustrated in FIG. 5, the spark plug 20 will be fired to ignite the compressed combustible mixture. In this position the lower links 33 of the epicyclical drive train extend downwardly substantially vertically and the upper links 31 are substantially in alignment with the lower links and with the arms 27 of the scavenger plate. When the spark plug fires and ignites the combustible mixture, the rapidly expanding gases drive the piston 12 downwardly to cause rotation of the crankshaft 18 by means of the connecting rod 16. Since the connecting rod is connected to the crankshaft, such connecting rod will swing to the right, as illustrated in FIG. 7, until the crank of the crankshaft is disposed substantially at 90° to top dead center. Movement of the connecting rod to the right will cause the sector or quadrant gears 41 to rotate the bevel gears 37 which in turn will rotate the pinion gears 34 and raise the lower links 33 to the position shown in FIG. 8 so that during the initial movement of the piston 12 in a downward direction the scavenger plate 26 will remain in substantially a fixed position adjacent to the cylinder head 11 to take full advantage of the expanding gases during the power stroke.

As the piston continues downwardly, the connecting rod 16 will reverse its direction of movement and begin to swing toward a vertical position, as shown in FIG. 9. Reversal of the movement of the connecting rod will reverse the direction of rotation of the bevel gears 37 and the pinion gears 34 so that when the connecting rod is in a generally vertical position, the lower links again will be in a substantially vertical position, as illustrated in FIG. 10. Rotation of the pinion gears 34 and the lower links 33 will cause the scavenger plate 26 to move rapidly toward the piston head 13 to force the hot gases through the exhaust port 25 and simultaneously to create a vacuum in the upper portion of the cylinder which will open the reed intake valve 19 and induct a fresh charge of combustible mixture into the cylinder.

As the connecting rod 16 passes bottom dead center, the direction of movement of the piston 12 will be reversed and the piston will begin to rise. Also the lower link 33 of each of the pinion gears will begin to move upwardly to the left, as illustrated in FIG. 11, and will raise the scavenger plate 26 at a much faster rate than the piston in rising until the connecting rod reaches the limit of its wing. Since the scavenger plate 26 is slightly smaller in diameter than the bore of the cylinder, the combustible mixture passes around the outer periphery of the scavenger plate into the area between the scavenger plate and the piston head. A slight compressing of the combustible mixture may be caused by the initial upward movement of the scavenger plate; however, as soon as the one-way valves 47 are exposed to the recesses 45, such valves will open and relieve the pressure by discharging the mixture into the recesses. As soon as the scavenger plate passes and recesses, the mixture therein is discharged into the cylinder for compression by the piston 12.

Continued upward movement of the connecting rod will reverse the direction of swing of the connecting rod and the lower links 33, while the piston continues to be moved in an upward direction to compress the combustible mixture. The reverse swinging of the connecting rod 16 and the lower links 33 will return such rod and links to a substantially vertical position, as shown in FIG. 5, in which the combustible mixture is fully compressed. As the connection rod approaches top dead center, the spark plug again will be fired and the process will be repeated.

It will be clear from an observation of FIGS. 6, 8, 10 and 12 that the lower links 33 are arranged in such a manner that when the connecting rod 16 swings to one side, the lower link on that side will swing out of the way, while the lower link on the opposite side can swing into the plane of the connecting rod. When the direction of swing of the connecting rod is reversed, the lower links likewise will be reversed and the link that had been in the plane of movement of the connecting rod will be moved out of such plane, while the lower link that was removed from the plane of the connecting rod will be rotated into the area where the connecting rod had been. With this timed relationship, the lower links can be moved into the plane of the connecting rod only when the connecting rod is not present.

It is noted that the scavenger plate 26 is spaced slightly from the piston head in the top dead center position of the connecting rod and that during the first quarter rotation of the crankshaft the piston is moving downwardly while the scavenger plate is substantially stationary. During the second quarter of rotation of the crankshaft the scavenger plate will move more rapidly than the piston to close the gap between the scavenger plate and the piston head so that the gap between the scavenger plate and the piston head is substantially the same at the bottom dead center position as it was at the top dead center position. In the third quarter rotation the scavenger plate is rapidly raised a substantial distance from the piston head and substantially to the top of the cylinder when the piston has been raised approximately halfway. During the last quarter of rotation the scavenger plate will remain substantially fixed as the piston continues to move upwardly while compressing the combustible mixture.

I claim:

1. A scavenger mechanism for an internal combustion engine having a cylinder wall structure, a piston slidably mounted within said cylinder wall, a crankshaft and a connecting rod swingably connecting said crankshaft and said piston, said scavenger mechanism comprising scavenger plate means mounted within said cylinder wall structure and above said piston, at least one arm connected at one end to said scavenger plate means and extending downwardly into said piston, first gear means carried by said connecting rod, second gear means rotatably carried by said piston and adapted to meshingly engage said first gear means, link means connecting said second gear means with said arm, so that swinging movement of said connecting rod will cause said first gear means to rotate said second gear means to raise and lower said scavenger plate means independently of and in conjunction with the up-and-down movement of said piston.

2. The structure of claim 1 including an exhaust port through said cylinder wall structure in a position that hot gases will be discharged from said cylinder wall structure through said exhaust port when said scavenger plate means is lowered relative to said piston.

3. The structure of claim 1 in which said second gear means includes a bevel gear adapted to be turned by said first gear means, a pinion gear drivingly engaging said bevel gear, a first link fixed to said pinion gear, and a second link swingably mounted at one end to said first link and swingably mounted at the opposite end to said arm.

4. In an internal combustion engine having a cylinder wall structure, a cylinder head enclosing one end of said cylinder wall structure, a hollow generally cylindrical piston having a a piston head at one end slidably mounted within said cylinder wall structure, a wrist pin extending across the interior of said piston, a connecting rod swingably attached at one end to said wrist pin, a crankshaft located below said piston, the opposite end of said connecting rod being rotatably connected to said crankshaft, means for introducing a combustible mixture into said cylinder wall structure between said cylinder head and said piston head in a position to be compressed by upward movement of said piston, means for igniting said combustible mixture after it has been compressed; the improvement comprising scavenger plate means located within said cylinder wall structure between said cylinder head and said piston head, a pair of spaced generally parallel arms connected to said scavenger plate means and extending downwardly through said piston head, an epicyclical drive train carried by said piston, said drive train including link means swingably connected to said arms, interengaging gear means mounted on said piston and said connecting rod and drivingly engaging said link means so that swinging movement of said connecting rod drives said epicyclical drive train to raise and lower said scavenger plate means independently of and in conjunction with the raising and lowering of said piston.

5. The structure of claim 4 in which said epicyclical drive train includes a bevel gear rotatably carried by said piston, a pinion gear meshing with said bevel gear and adapted to be driven thereby, a first link fixed to said pinion gear, and a second link swingably connecting said first link and one of said arms.

6. The structure of claim 5 in which said gear means on said connecting rod is a quadrant gear meshing with said bevel gear.

* * * * *